May 14, 1957 W. R. BECK ET AL 2,792,091
COMBINATION DISC BRAKE AND EXHAUST FAN FOR ELECTRIC
CONTROL CASE VENTILATION
Filed Aug. 19, 1953 5 Sheets-Sheet 1
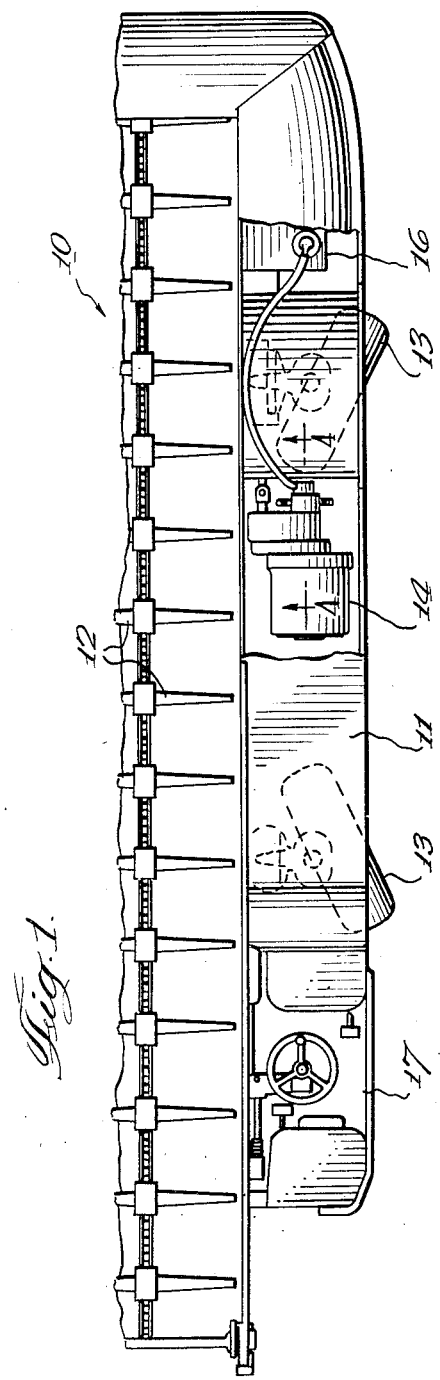
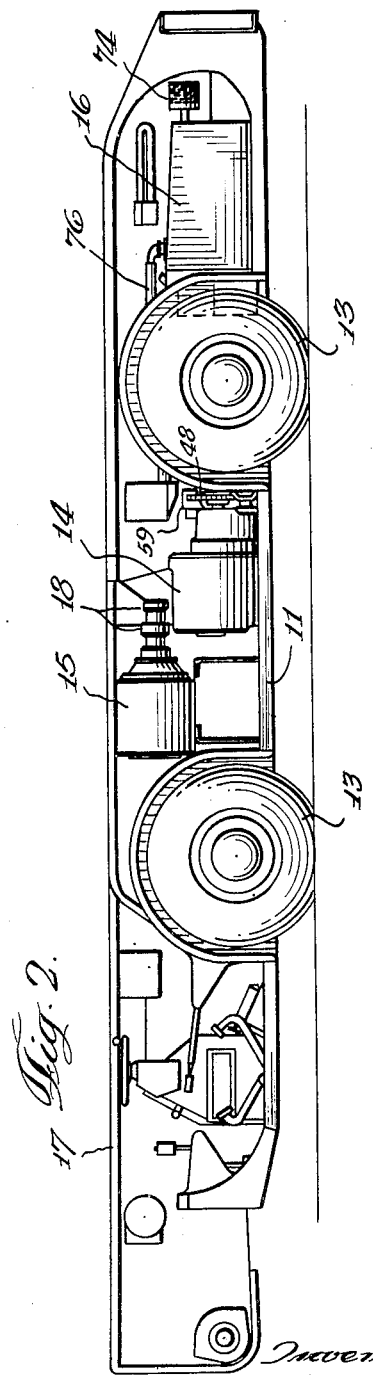
Inventors
William R. Beck
Loy D. Hagenbook
By Murray A. Gleeson
Attorney

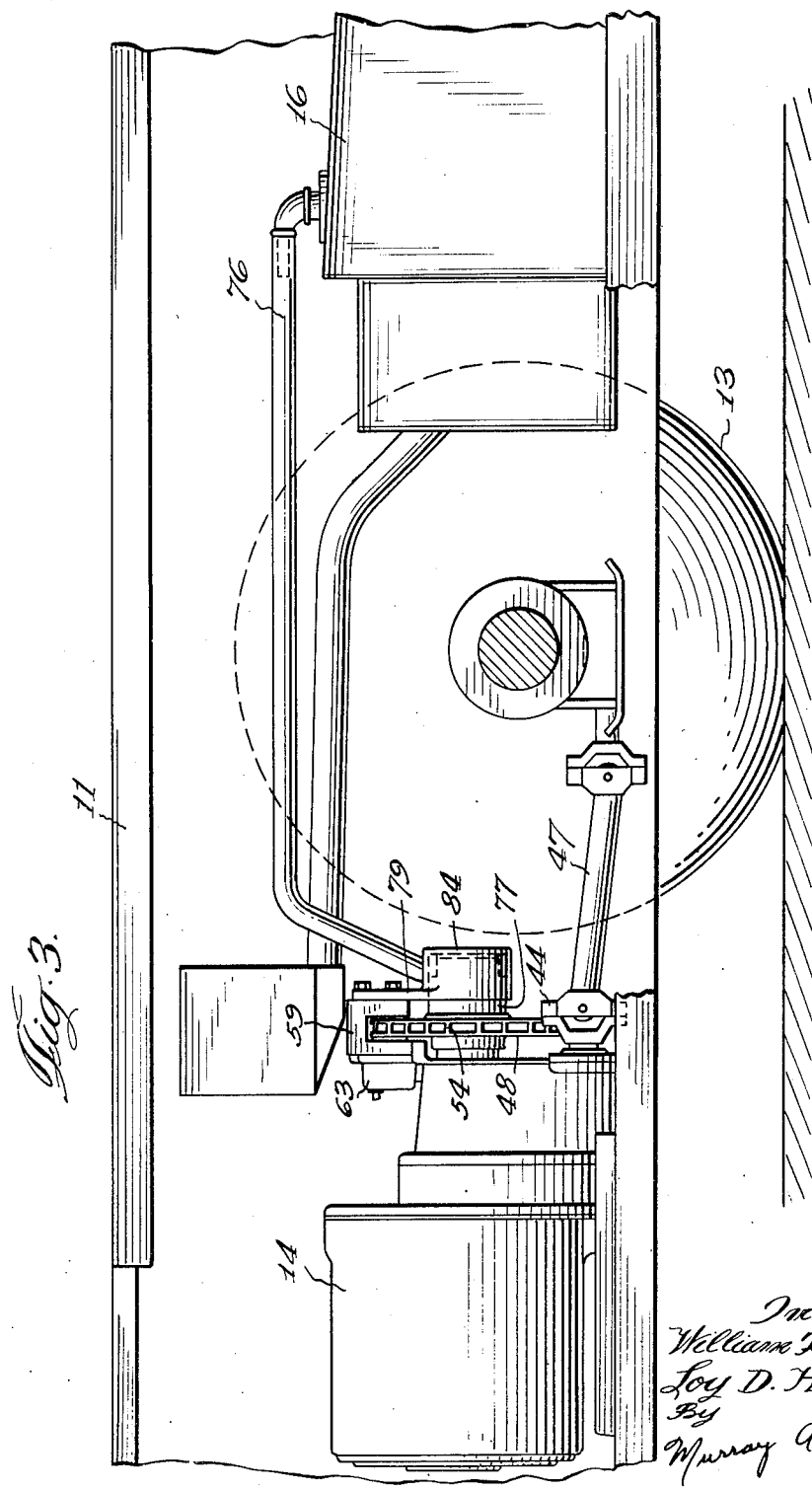

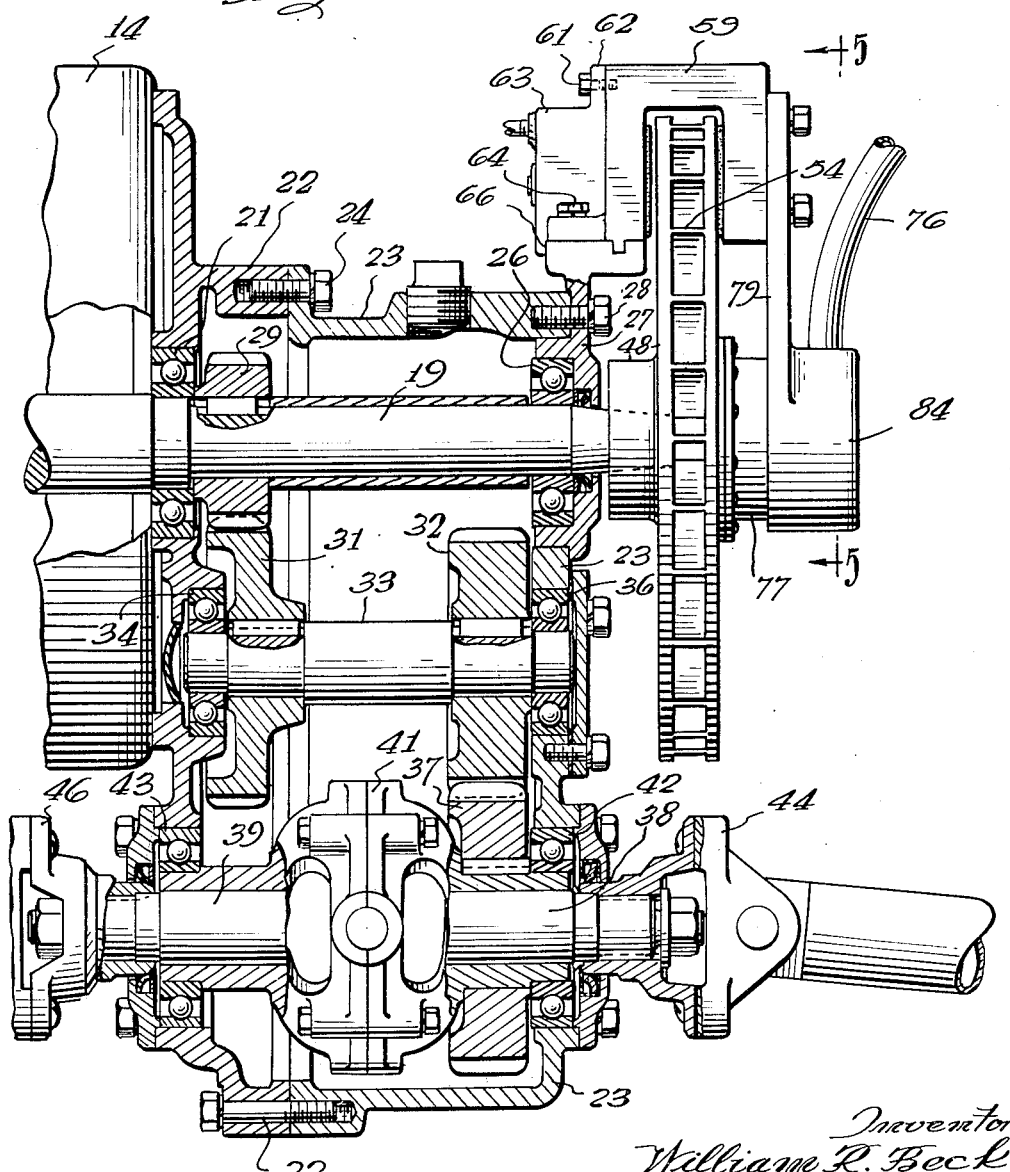

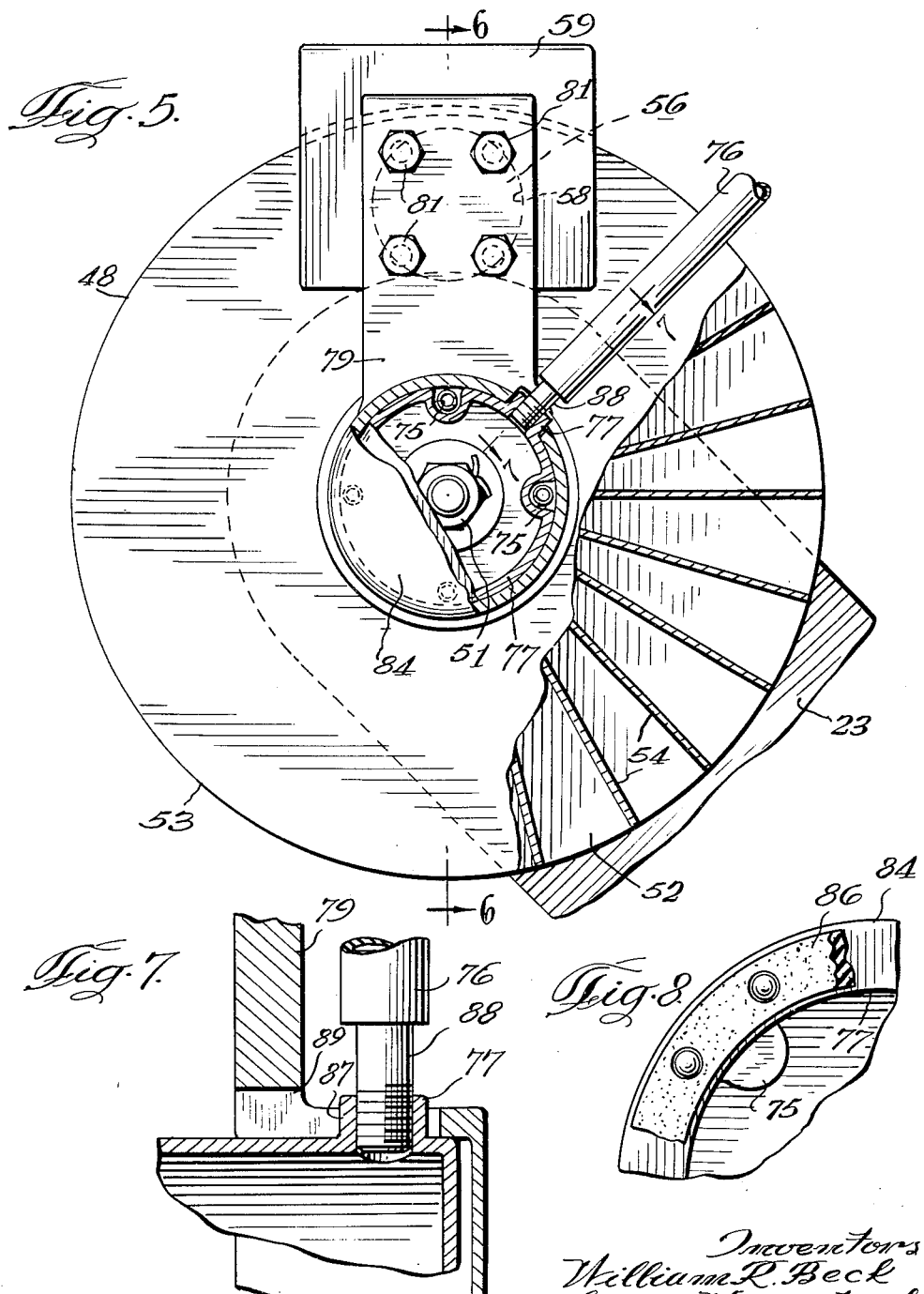

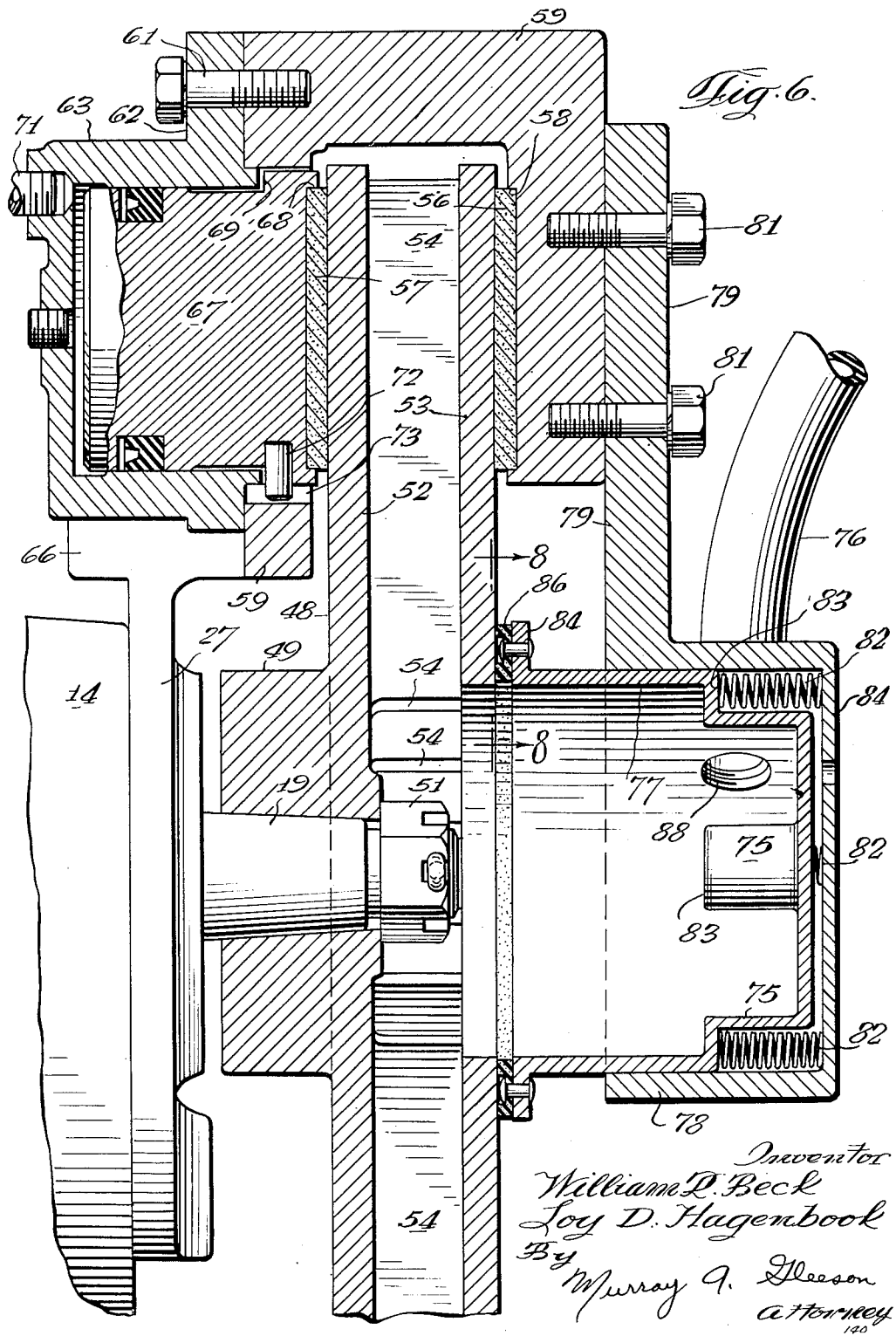

United States Patent Office 2,792,091
Patented May 14, 1957

2,792,091

COMBINATION DISC BRAKE AND EXHAUST FAN FOR ELECTRIC CONTROL CASE VENTILATION

William R. Beck and Loy D. Hagenbook, Chicago, Ill., assignors to Goodman Manufacturing Company, Chicago, Ill., a corporation of Illinois Application August 19, 1953, Serial No. 375,252

5 Claims. (Cl. 192—2)

This invention relates generally to electrically operated vehicles and more particularly to an improved means for cooling the brake and the control device for such vehicle by a constantly moving current of air. More particularly, the invention relates to a combination motor brake and exhaust fan for ventilation of the interior of the control case of such vehicle.

In certain types of mine vehicles, of which shuttle cars are an example, the dirigible wheels are driven from an electric motor controlled from an operator's seat, from which station the controls for such motor are operated. Such vehicles are oftentimes operated in gaseous areas, and the controls therefor which arc in their operation, must be confined within a housing so that dangerous explosions are averted. However, the arcing of the contacts of such controls creates an allotropic form of oxygen known as ozone, which allotropic form is extremely active thereby causing a great deal of corrosion at the contact points.

Such vehicles are arranged with brakes, generally of the disc type, which are disposed generally on the motor armature shaft. The operation of such disc type brakes creates a great amount of heat between the brake disc and the friction braking material.

In order to provide movement of air past the contacts within the control box it has heretofore been the practice to provide an auxiliary fan for such movement, thereby imposing an additional load upon the drive motor of such vehicle. According to the present invention, the control box is swept at all times by a moving current of air, the same moving current of air being directed to the brake disc of a disc type of friction brake for the cooling of same.

One of the principal objects of this invention is to provide in a mine vehicle which must operate in gaseous areas a combination brake and exhaust means for ventilation of the control case of such vehicle, said exhaust means also performing the dual function of cooling the brake of such vehicle.

Other objects and important features of the invention will be apparent from a study of the following specification taken with the drawings which together show a preferred embodiment of the invention and what is now considered to be the best mode of practicing the principles thereof. Other embodiments of the invention will be apparent to those having the benefit of the teachings herein, and it is therefore intended that the invention not be limited by the precise embodiment shown herein, other embodiments being intended to be reserved especially as they fall within the purview of the subjoined claims.

In the drawings:

Fig. 1 is a partial plan view of a mine haulage vehicle having embodied therein the improvements according to the present invention;

Fig. 2 is a side view thereof;

Fig. 3 is an enlarged side view of a portion of the vehicle shown in Figure 2;

Fig. 4 is a vertical sectional view taken along the line of 4—4 of Fig. 1 looking in the direction of the arrows, showing certain details of construction of the friction brake and a gear case for effecting a driving connection with a pair of dirigible wheels of the vehicle shown in Fig. 1;

Fig. 5 is an end view of the brake disc shown in Fig. 4, said view looking in the direction of the arrows 5—5 of Fig. 4;

Fig. 6 is an enlarged vertical sectional view taken along the line 6—6 of Fig. 5 looking in the direction of the arrows;

Fig. 7 is a detail view taken along the line 7—7 of Fig. 5 looking in the direction of the arrows; and Fig. 8 is a detail view looking in the direction of the arrows 8—8 of Fig. 6.

Referring now to the drawings, the improvements according to the present invention are embodied into a mine haulage vehicle or shuttle car indicated generally by the reference numeral 10. Such a vehicle consists of a main body 11 having a flight conveyor 12 extending longitudinally thereof, and is provided with dirigible wheels 13, 13 which are driven from a motor 14 connected through a control box 16 and operated from a driver's seat or control station 17.

Power for driving the conveyor 12 and for steering of the dirigible wheels 13, 13 is provided by an auxiliary motor 15 which operates tandem fluid pressure pumps 18.

The description of the vehicle 10 thus far is conventional and other details of construction thereof need not be described herein, such other construction details being according to that shown in one or more patents to William R. Beck, Patent No. 2,588,341 being an example thereof.

Referring now particularly to Figs. 3 and 4 of the drawings, the drive motor 14 includes a motor drive shaft 19 mounted in a bearing 21 of an end bell 22 of the housing for the motor 14. The shaft 19 turns within a housing 23 held by cap screws 24 to the end bell 22. The shaft 19 is also supported upon a bearing 26 held in a cap 27 secured to the housing 23 by cap screws 28.

A driving pinion 29 is keyed to the shaft 19 and drives a pair of reach gears 31 and 32 fast to a shaft 33 turning in bearings 34 and 36 mounted in the end bell 22 and the housing 23 respectively. The reach gear 32 meshes with a final driven gear 37 keyed to a driving shaft 38, flexibly coupled to a driving shaft 39 by means of a flexible coupling 41, the shafts 38 and 39 being mounted in bearings 42 and 43 in the housing 23 and the end bell 22 respectively. The shafts 38 and 39 extend beyond the housing 23 and the bell 22 and are fitted with universal joints 44 and 46 respectively, universal joint 44 being connected to a drive shaft 47 to drive the dirigible wheel 13 in a manner well known in the art. Universal joint 46 is also connected to a drive shaft, not shown, to drive the other dirigible wheel 13 in a manner well known in the art. It will be apparent, of course, that the pair of wheels on the opposite side of the vehicle 10 are also driven in the same manner as has been just described.

Referring now particularly to Figs. 4, 5, and 6 of the drawings, the end of the shaft 19 protruding beyond the housing 23 has fixed thereto a brake disc 48 having a hub 49 fitted to the tapered end of the shaft 19, as shown in Fig. 5, and held thereto by means of a castellated nut 51 threaded to the end of the shaft 19. The friction disc 48 has spaced walls 52 and 53 which are connected by radially extending webs 54 which terminate at their inward ends near the hub 49.

The outer faces of the brake disc 48 are adapted to be frictionally engaged at times by a pair of friction discs 56 and 57, friction disc 56 being retained within a circular recess 58 of a mounting 59 which is held by cap screws 61 to a flange 62 of an actuating cylinder 63. Said actuating cylinder 63 is held by a means of cap screws 64, see Fig. 4, to a support 66 formed integrally with the cap 27.

A piston 67 slidable within the cylinder 63 has a circular recess 68 for holding the friction material 57, and has a shoulder 69 arranged to limit movement of the piston 67 in a direction to the left. Fluid under pressure is supplied to the cylinder 63 by means of a pressure conduit 71, and the piston 67 is held against rotation by the torque imposed by the disc 48 through the medium of a pin 72 retained thereby, which pin is arranged to move in a slot 73 formed on the support 59, see particularly Fig. 6.

The rotation of the disc 48 is adapted to exhaust air from the control housing 16, see Figs. 1 and 2, the control housing having a flame arrester and air cleaner 74 mounted thereon. An exhaust conduit 76 leads from the control housing 16 and enters the interior of the brake disc at a pump intake chamber 77, arranged to slide in a generally cylindrical bell 78 having an arm 79 which is held by cap screws 81 to the support 59. The intake chamber 77 is urged against the outer face of the wall 53 of the brake disc 48 by means of coiled springs 82 which are held in essentially cylindrical recesses 75, see also Fig. 5, around the circumference of the intake chamber 77, one end of such springs being bottomed against a shoulder 83 formed on the intake chamber 77 and the other end being bottomed against an end wall 84 of the bell 78. The chamber 77 is formed with an annular flange 86 having riveted thereto a ring of sealing material 86, see also Fig. 8, which bears against the outer face of the wall 53 of the disc 48.

The intake chamber 77 is restrained against rotative movement caused by the disc 48 through the medium of a hollow boss 87, see Fig. 7, which is threaded to receive a nipple 88 affording a place of connection for the conduit 76. The boss 87 is movable under the urgence of the springs 82 in a slot 89 formed in the bell 78.

From the description thus far it will be apparent that as the motor 14 operates, fresh air will enter the control casing 16 by means of the filter 74, being exhausted therefrom by the exhaust conduit 76, the air entering the intake chamber 77 and moving radially of the brake disc 48 by means of the radial passageways defined by the webs 54 and the spaced walls 52 and 53 thereof. During the braking action such movement of the air continues to take place, and when the piston 67 is moved together with the friction material 57 by pressure at the inlet condut 71, the braking action will take place between the two spaced discs 52 and 57.

Without the provision of the cooling air which is swept by the disc 48, the heat developed by the two friction discs 56 and 57 would increase beyond a permissible amount, in cases particularly where the vehicle 10 is operating in a gaseous area. The air being swept by the hollow disc 48 thus reduces such heat of braking below a permissible amount.

From the foregoing description it will be apparent that there has been provided a novel combination whereby the air within the control box is kept substantially free from ozone which would cause increased corrosion of the contacts as has been previously explained. Such air being swept from the control case 16 is also made available for cooling of the brake disc 48 at such times when the greatest amount of heat is developed during the braking operation, that is to say, during the initial braking operation.

While the invention has been described in terms of a preferred embodiment thereof, it is not intended that the scope thereof be limited by the precise embodiment herein shown, the invention being intended to be limited only by the terms of the claims now appended.

We claim as our invention:

1. In an electric powered vehicle having a drive motor and a control for said drive motor including a housing for said control, a brake for said vehicle comprising a rotating brake disc and means for applying braking effort to said brake disc, means for conjointly sweeping air through said housing and for providing cooling air during the braking operation, said means comprising spaced walls on said brake disc which are joined by substantially radially extending web members, a hollow sealing member having sealing means thereon bearing against one of said spaced walls, the interior of said hollow sealing member being in communication with passages defined by said web members, a support for said hollow sealing member, means for urging said hollow sealing member against the said wall, means for preventing rotative movement of said sealing member during rotation of said disc, a conduit connecting the interior of said hollow sealing member with said housing, and a filter on said housing for air entering said housing.

2. In an electric powered vehicle having a drive motor and a control for said drive motor including a housing for said control, a brake for said vehicle comprising a rotating brake disc and means for applying braking effort to said brake disc, means for conjointly sweeping air through said housing and for providing cooling air during the braking operation, said means comprising spaced walls on said brake disc which are joined by substantially radially extending web members, a hollow sealing member having sealing means thereon bearing against one of said spaced walls, the interior of said hollow sealing member being in communication with passages defined by said web members, a support for said hollow sealing member, means for urging said hollow sealing member against the said wall, means for preventing rotative movement of said sealing member during rotation of said disc, and a conduit connecting the interior of said hollow sealing member with said housing.

3. In an electric powered vehicle having a drive motor and a control for said drive motor including a housing for said control, a brake for said vehicle comprising a rotating brake disc and means for applying braking effort to said brake disc, means for conjointly sweeping air through said housing and for providing cooling air during the braking operation, said means comprising spaced walls on said brake disc which are joined by substantially radially extending web members, a hollow sealing member having sealing means thereon bearing against one of said spaced walls, the interior of said hollow sealing member being in communication with passages defined by said web members, a support for said hollow sealing member, means for urging said hollow sealing member against the said wall, and a conduit connecting the interior of said hollow sealing member with said housing.

4. In an electric powered vehicle having a drive motor and a control for said drive motor including a housing for said control, a brake for said vehicle comprising a rotating brake disc and means for applying braking effort to said brake disc, means for conjointly sweeping air through said housing and for providing cooling air during the braking operation, said means comprising spaced walls on said brake disc which are joined by substantially radially extending web members, a hollow sealing member having sealing means thereon bearing against one of said spaced walls, the interior of said hollow sealing member being in communication with passages defined by said web members, means for preventing rotative movement of said sealing member during rotation of said disc, and a conduit connecting the interior of said hollow sealing member with said housing.

5. In an electric powered vehicle having a drive motor and a control for said drive motor including a housing for said control, a brake for said vehicle comprising a rotating brake disc and means for applying braking effort to said brake disc, means for conjointly sweeping air through said housing and for providing cooling air during the braking operation, said means comprising spaced walls on said brake disc which are joined by substantially radially extending web members, a hollow sealing member having sealing means thereon bearing against one of said spaced walls, the interior of said hollow sealing member being in communication with passages defined by said web members, means for urging said hollow sealing member against the said wall, and a conduit connecting the interior of said hollow sealing member with said housing.

References Cited in the file of this patent

UNITED STATES PATENTS

| | | |
|---|---|---|
| 1,193,490 | Wood | Aug. 1, 1916 |
| 2,597,603 | Tack | May 20, 1952 |